Patented July 18, 1939

2,166,223

UNITED STATES PATENT OFFICE 2,166,223

ANTIOXIDANT

Waldo L. Semon, Silver Lake, Ohio, assignor to The B. F. Goodrich Company, New York, N. Y., a corporation of New York No Drawing. Application September 30, 1937, Serial No. 166,561

17 Claims. (Cl. 18—50)

This invention relates particularly to the art of rubber manufacture and especially to the preservation of rubber and rubber goods against deterioration, but includes also the preservation of other organic materials which tend to deteriorate by absorption of oxygen from the air such as fatty oils, cracked gasoline and other petroleum products, essential oils, soaps, synthetic plastics, and the like.

It is well known that many organic substances undergo a more or less rapid deterioration which is commonly ascribed to the action of atmospheric oxygen. It has heretofore been proposed to retard or inhibit this deterioration by adding a small proportion of a phenol, an aromatic base, or some other like substance, termed generally an "antioxidant".

I have discovered a new class of antioxidants which are extraordinarily effective in retarding the deterioration of rubber and like organic materials. The compounds which belong to this class are products obtained by reacting aromatic amines and alcohols in the presence of oxidizing agents, which reaction is preferably catalyzed by an acid catalyst. These reaction products are usually complex oily or solid mixtures of indefinite and in many cases unknown composition.

The aromatic amines employed in the preparation of the antioxidants of this invention are in general primary or secondary amines which contain at least one aromatic group and at least one hydrogen directly attached to the amino nitrogen, and which may or may not contain substantially neutral substituents such as alkyl, hydroxy and alkoxy groups. Typical compounds include aniline, the toluidines, the ethyl anilines, the phenetidines, the anisidines, the naphthylamines, the xenylamines, diamino diphenyl methane, diphenylamine, the phenyl naphthyl amines, the ethyl naphthylamines, the phenyl cumyl amines, the amino diphenylamines, the hydroxy diphenylamines, the phenyl anisyl amines, etc.

The alcohols employed in this invention are in general aliphatic, alicyclic, or aralkyl alcohols which contain only carbon, hydrogen, and oxygen and which may or may not contain substantially neutral substituents such as alkoxy groups. Typical compounds include methanol, ethanol, the propanols, the butanols, allyl alcohol, cyclohexanol, ethylene glycol, glycerol, benzyl alcohol, beta-hydroxy diethyl ether, alpha-ethyl hexanol, etc.

A wide variety of organic and inorganic oxidizing agents including such compounds as nitrobenzene, dinitrobenzene, nitronaphthalene, azobenzene, manganese dioxide, lead peroxide, potassium chromate, dilute nitric acid, etc., may be used.

Illustrative of the type of catalyst that may be employed in the reaction are: hydrochloric acid, sulfuric acid, phosphoric acid, zinc chloride, aluminum chloride, stannic chloride, ammonium bromide and iodine. These materials are either acids or are capable of generating acids upon hydrolysis or upon contact with organic substances and may for convenience be termed "acidic catalysts". Although catalysts are usually employed in the reaction, good antioxidants may be made by performing the reaction in the absence of a catalyst.

Although it is not essential in all cases, the best results are obtained when an excess of aromatic amine is used. I prefer to carry out the reaction with at least two mols of aromatic amine for each mol of alcohol, and I often increase the amount of aromatic amine to eight mols or more. The reaction is preferably carried out in an autoclave with a glass or other corrosion-resistant lining. The temperature usually ranges from 150° to 300° C. or more; 259° C., the boiling point of diphenyl oxide, being a convenient temperature at which to perform the reaction.

The invention will be best understood by reference to the following specific examples, in which the simplest alcohols and aromatic amines are employed, but only for illustrative purposes since any of the other materials described above may be substituted with suitable changes in proportions and in the conditions of the reaction.

*Example 1.*—338 parts by weight of diphenylamine, 30 parts of isopropanol, 21 parts of nitrobenzene, and 45 parts of concentrated hydrochloric acid were heated for 6 hours at 259° C. The reaction mixture was washed with water and with aqueous sodium hydroxide, and the excess diphenylamine and nitrobenzene were removed by distillation. The product was a thick dark oil containing about 20% of meso, meso, dimethyl acridane. When this reaction product was incorporated in a typical rubber stock, the rate of deterioration of the rubber due to artificial aging was from one-third to one-fourth as great as that in a similar stock containing no antioxidant.

*Example 2.*—Diphenylamine 338 parts, cyclohexanol 50 parts, nitrobenzene 25 parts, and concentrated hydrochloric acid 51 parts were heated for 4 hours at 259° C. When the reaction mixture was washed with water and with aqueous sodium hydroxide, and the excess reactants were removed by distillation, there remained 206 parts of an oily residue which was an excellent antioxidant. When this residue was incorporated in a typical rubber stock, the rate of deterioration of the rubber due to artificial aging was from one-fourth to one-fifth as great as that in a similar stock containing no antioxidant.

*Example 3.*—Aniline 372 parts, ethanol 23 parts, nitrobenzene 25 parts, and concentrated hydrochloric acid 51 parts were heated for 4 hours at 259° C. After the product was washed and excess reactants were removed as in the preceding examples, there remained a thick oil which when incorporated into a rubber stock retarded the deterioration to a rate one-third to one-fifth that of a corresponding stock containing no antioxidant.

*Example 4.*—372 parts of aniline, 62 parts of ethylene glycol, 25 parts of nitrobenzene, and 51 parts of concentrated hydrochloric acid were heated for 4 hours at 259° C. Treatment of the product similar to that in the previous examples produced an oily residue which was an excellent antioxidant.

If desired, a mixture of alcohols or aromatic amines may be used in the reaction. An excellent antioxidant is obtained by reacting "Stenol", a mixture of higher alcohols believed to be derived from stearic acids, with aniline in the presence of azobenzene and zinc chloride.

Any of the antioxidants of this invention, and specifically any one of the products prepared by the methods outlined above, may be employed to retard the deterioration of rubber either before or after vulcanization. For example, a tire tread composition containing rubber 100 parts by weight, gas black 50 parts, zinc oxide 5.0 parts, lauric acid 2.15 parts, pine tar 1.35 parts, palm oil 1.00 part, sulfur 3.25 parts, polybutylidene-aniline accelerator 0.5 part and antioxidant 0.75 part vulcanized for 60 minutes at 295° F. was used to determine the age-resisting properties of the specific antioxidants prepared in the foregoing examples.

Any of the antioxidants within the scope of this invention may be similarly employed in any type of rubber composition, such as those used for automobile tires and tubes, hose, belting, sheet and thread rubber, rubberized fabrics, molded goods, seamless dipped goods, boots and shoes, etc. whether vulcanized in a mold, in open steam, in hot air, or even vulcanized in the cold by the so-called acid process. The proportion of antioxidant may vary from about 0.1% to 5%, although either smaller or greater proportions may be found useful, and it may be added to the rubber or other substance at any desired state of the preparation of the product. If the material to which it is added is a liquid such as a rubber cement, latex, cracked gasoline, or an oil, the antioxidant may simply be dissolved or suspended therein in a suitable small proportion, say 0.2% by weight. It is accordingly to be understood that the term "treating" is employed in the appended claims in a generic sense to embrace the incorporation of the antioxidant into a solid substance by milling or mastication, its addition to an aqueous dispersion such as rubber latex in a finely dispersed form, its solution in liquids, and any equivalent methods such as applying it to the surface of vulcanized or unvulcanized rubber in the form of a powder, paste, or solution.

The term "rubber" unless otherwise limited is likewise employed in a generic sense to include caoutchouc, balata, gutta-percha, reclaimed rubber, synthetic rubber, artificial rubber isomers, and like products, whether vulcanized or unvulcanized and whether or not admixed with fillers, pigments, vulcanizing and accelerating agents.

While I have herein disclosed certain specific embodiments of my invention, I do not intend to limit myself solely thereto, for many modifications including substituting materials having equivalent chemical properties and varying the proportions of materials used are within the spirit and scope of the invention as defined in the appended claims.

I claim:

1. The method of retarding the deterioration of an organic substance which tends to deteriorate by absorption of oxygen from the air which comprises treating the said substance with the product obtained by reacting at a temperature within the range 150 to 300° C. an aromatic amine containing at least one hydrogen on the amino nitrogen and an alcohol in the presence of an oxidizing agent.

2. The method of preserving rubber which comprises treating rubber with the product obtained by reacting at a temperature within the range 150 to 300° C. an aromatic amine containing at least one hydrogen on the amino nitrogen and an alcohol in the presence of an oxidizing agent.

3. The method of preserving rubber which comprises treating rubber with the product obtained by reacting at a temperature within the range 150 to 300° C. an aromatic amine containing at least one hydrogen on the amino nitrogen and an alcohol in a molal ratio of at least 2:1 in the presence of an oxidizing agent.

4. The method of preserving rubber which comprises treating rubber with the product obtained by reacting at a temperature within the range 150 to 300° C. an aromatic amine containing both hydrogen and aryl groups but no others attached to the amino nitrogen and an alcohol containing no aryl groups in the presence of an oxidizing agent.

5. The method of preserving rubber which comprises treating rubber with the product obtained by reacting at a temperature within the range 150 to 300° C. a secondary diarylamine with an alkyl alcohol in the presence of an oxidizing agent.

6. The method of preserving rubber which comprises treating rubber with the product obtained by reacting at a temperature within the range 150 to 300° C. a secondary diarylamine with an alicyclic alcohol in the presence of an oxidizing agent.

7. The method of preserving rubber which comprises treating rubber with the product obtained by reacting at a temperature within the range 150 to 300° C. diphenylamine with isopropanol in a molal ratio of at least 2:1 in the presence of an oxidizing agent and an acidic catalyst.

8. The method of preserving rubber which comprises treating rubber with the product obtained by reacting at a temperature within the range 150 to 300° C. diphenylamine with cyclohexanol in a molal ratio of at least 2:1 in the presence of an oxidizing agent and an acidic catalyst.

9. The method of preserving rubber which comprises treating rubber with the product obtained by reacting at a temperature within the range 150 to 300° C. aniline and an alcohol containing no aryl groups in the presence of an oxidizing agent.

10. The method of preserving rubber which comprises treating rubber with the product obtained by reacting at a temperature within the range 150 to 300° C. aniline and ethanol in a molal ratio of at least 2:1 in the presence of an oxidizing agent and an acidic catalyst.

11. A composition comprising an organic substance which tends to deteriorate by absorption of oxygen from the air and the product obtained by reacting at a temperature within the range 150 to 300° C. an aromatic amine containing at least one hydrogen on the amino nitrogen and an alcohol in the presence of an oxidizing agent.

12. A composition comprising rubber and the reaction product defined in claim 3.

13. A composition comprising rubber and the reaction product defined in claim 5.

14. A composition comprising rubber and the reaction product defined in claim 6.

15. A composition comprising rubber and the reaction product defined in claim 7.

16. A composition comprising rubber and the reaction product defined in claim 8.

17. A composition comprising rubber and the reaction product defined in claim 10.

WALDO L. SEMON.